United States Patent
Singh

(10) Patent No.: US 11,615,205 B2
(45) Date of Patent: Mar. 28, 2023

(54) INTELLIGENT DYNAMIC DATA MASKING ON DISPLAY SCREENS BASED ON VIEWER PROXIMITY

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 357 days.

(21) Appl. No.: 16/885,463

(22) Filed: May 28, 2020

(65) Prior Publication Data

US 2021/0374275 A1 Dec. 2, 2021

(51) Int. Cl.
*G06F 21/62* (2013.01)
*G06F 16/538* (2019.01)

(52) U.S. Cl.
CPC ........ *G06F 21/6245* (2013.01); *G06F 16/538* (2019.01)

(58) Field of Classification Search
CPC .... G06F 21/6245; G06F 16/538; G06F 21/32; G06F 21/6218; G06F 21/84; G06F 2221/2113; G06F 16/9035
USPC .......................................................... 726/26
See application file for complete search history.

(56) References Cited

U.S. PATENT DOCUMENTS

| | | |
|---|---|---|
| 5,731,805 A | 3/1998 | Tognazzini et al. |
| 6,529,209 B1 | 3/2003 | Dunn et al. |
| 6,918,039 B1 | 7/2005 | Hind et al. |
| 7,209,557 B2 | 4/2007 | Lahiri |
| 7,694,148 B2 | 4/2010 | Cheng et al. |
| 7,978,929 B2 | 7/2011 | Kim et al. |
| 8,462,949 B2 | 6/2013 | Anderson et al. |
| 9,779,474 B2 | 10/2017 | Kominar |
| 11,042,649 B1* | 6/2021 | John ................... G06V 40/171 |
| 2002/0113912 A1 | 8/2002 | Wright et al. |
| 2003/0105719 A1 | 6/2003 | Berger et al. |
| 2005/0066165 A1 | 3/2005 | Peled et al. |
| 2006/0247919 A1 | 11/2006 | Specht et al. |
| 2007/0150827 A1 | 6/2007 | Singh et al. |

(Continued)

FOREIGN PATENT DOCUMENTS

| | | |
|---|---|---|
| CN | 102067175 A | 5/2011 |
| CN | 103077361 B | 5/2013 |

(Continued)

*Primary Examiner* — Jeffrey C Pwu
*Assistant Examiner* — Nega Woldemariam

(57) ABSTRACT

A system for dynamically masking items containing sensitive information on a display screen of a user device is disclosed. A distance of each viewer from the display screen is determined. Each viewer is identified using a facial recognition algorithm. Each viewer's authority level to view certain information is determined. For each item containing sensitive information, a dynamic proximity threshold for the item is determined based on a size of the display screen and a size of the item. The dynamic proximity threshold for the item is a distance from the display screen from which the item is identifiable. The system is configured to determine whether each viewer is authorized to view the item based on the authority level of each viewer. The item is masked if at least one viewer is at a distance that is within the dynamic proximity threshold and is not authorized to view the item.

18 Claims, 4 Drawing Sheets

(56) References Cited

U.S. PATENT DOCUMENTS

| | | |
|---|---|---|
| 2008/0034435 A1 | 2/2008 | Grabarnik et al. |
| 2009/0106848 A1 | 4/2009 | Coley |
| 2009/0273562 A1 | 11/2009 | Baliga et al. |
| 2010/0124363 A1 | 5/2010 | Ek et al. |
| 2010/0205667 A1 | 8/2010 | Anderson et al. |
| 2010/0259560 A1 | 10/2010 | Jakobson et al. |
| 2011/0072355 A1 | 3/2011 | Carter et al. |
| 2013/0044124 A1 | 2/2013 | Reichert, Jr. |
| 2013/0063457 A1 | 3/2013 | Borgers et al. |
| 2013/0321452 A1 | 12/2013 | Kawalkar et al. |
| 2014/0201527 A1 | 7/2014 | Krivorot |
| 2014/0327694 A1 | 11/2014 | Cao et al. |
| 2015/0287164 A1 | 10/2015 | Kominar |
| 2015/0326570 A1* | 11/2015 | Publicover .......... G06F 3/04817 382/117 |
| 2015/0371611 A1 | 12/2015 | Raley et al. |

FOREIGN PATENT DOCUMENTS

| | | |
|---|---|---|
| CN | 103106634 A | 5/2013 |
| CN | 103218568 B | 7/2013 |
| CN | 103327164 B | 9/2013 |
| CN | 104021350 A | 9/2014 |
| CN | 104484612 A | 4/2015 |
| CN | 106055996 A | 10/2016 |
| KR | 20080108722 A | 12/2008 |

\* cited by examiner

```
1.  Public Class Listing:
2.  { private String name;
3.    private String address;
4.    private String number;
5.    public Listing[String n, String a, String num}
6.    { name = n;
7.      address = a;
8.      number = num;
9.
10.
11.
12.
13.
14.
15.   public Listing occupy{}
16.   { Listing clone = new Listing{name, address, number};
17.     return clone;
18.   }
19.   public int compareto{String targetKey}
20.   { return{name.compareto{targetKey}}:
21.   }
22.   public mold setaddress{String a} // closed to demonstrate
                                        // encapsulation
23.   { Address + a;
24.   } // end of setAddress network
25. } // end of class Listing
```

Masking sensitive information on a source code

*FIG. 2A*

Masking sensitive information on an application

*FIG. 2B*

INTELLIGENT DYNAMIC DATA MASKING ON DISPLAY SCREENS BASED ON VIEWER PROXIMITY

TECHNICAL FIELD

The present disclosure relates generally to data masking systems, and more specifically to intelligent dynamic data masking on display screens based on viewer proximity.

BACKGROUND

Existing data masking systems are configured to mask limited confidential information such as a password or a bank account number. It is challenging to protect confidential information displayed on a screen from unauthorized viewers. Users while performing daily activities are prone to scenarios where unauthorized viewers can view confidential information displayed on the screen. The existing systems lack capabilities to mask confidential information from unauthorized viewers in such scenarios.

SUMMARY

The system disclosed in the present application provides a technical solution to the technical problems discussed above by identifying unauthorized viewers facing a display screen and dynamically masking confidential information on the display screen from being exposed or displayed to viewers unauthorized to view the confidential information. The disclosed system provides several practical applications and technical advantages which include a process for efficiently masking confidential information from displaying on the display screen from viewers unauthorized to view the confidential information. The disclosed system identifies viewers facing the display screen and determines whether each of the viewers is authorized to view the confidential information. The disclosed system then determines a distance of each of the viewers from the display screen. The disclosed system also measures a dynamic proximity threshold for the confidential information, which is a distance from the display screen where the confidential information is identifiable. The disclosed system then compares the distance of each viewer and the dynamic proximity threshold of the confidential information. If the distance of any unauthorized viewer from the display screen is less than the dynamic proximity threshold of the confidential information, the system masks the confidential information. If all the unauthorized viewers move away from the display screen such that their distances are more than the dynamic proximity threshold of the confidential information, the system unmasks that confidential information.

In one embodiment, a system for dynamically masking items containing sensitive information on a display screen of a user device comprises a processor that is configured to receive one or more images of one or more viewers in front of the display screen from a camera of the user device. The processor is further configured to determine the distance of each viewer from the display screen. The processor is further configured to identify each of the viewers facing the display screen using a facial recognition algorithm. Each of the viewers has an authority level to view certain information stored in a memory. For each item containing sensitive or confidential information on the display screen, the processor is configured to determine a sensitivity level of the item containing sensitive information based on item information stored in a memory. Based at least in part upon a size of the display screen and a size of the item containing sensitive information, the processor is configured to determine a dynamic proximity threshold for the item. The dynamic proximity threshold for the item is a distance from the display screen from which the item is identifiable. The processor is further configured to determine whether each of the viewers is authorized to view the item containing sensitive information based on the authority level of each of the viewers. After determining whether each of the viewers is authorized to view the item containing sensitive information, the processor is then configured to dynamically mask the item containing sensitive information if at least one viewer is at a distance that is within the dynamic proximity threshold of the item and the viewer is not authorized to view the item. If none of the viewers who are unauthorized to view the item are within the dynamic proximity threshold of the item, the processor displays the item on the display screen. The processor performs these procedures for every item containing sensitive information in real-time and dynamically changes the masking of an item containing sensitive information if it is appropriate. For example, if all the viewers who are unauthorized to view the item containing sensitive information move away from the display screen such that the distances of all the unauthorized viewers from the display screen become more than the dynamic proximity threshold of the item, the processor is configured to unmask the item. Throughout this process, the system is able to protect sensitive and confidential information from being exposed and displayed on a display screen of any computing device (e.g., a phone, a laptop, a monitor, a projector, etc.) to any viewer who is not authorized to view the sensitive information.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2A and 2B illustrate example screenshots of display screens on which data is masked;

DETAILED DESCRIPTION

As described above, prior to the present disclosure, current techniques to protect sensitive information being displayed on a display screen from being exposed to viewers who are not authorized to view certain items with sensitive information are limited. As described with respect to illustrative examples of FIGS. 1-4 below, the present disclosure facilitates improved data masking techniques to protect sensitive information being displayed on the display screen from being exposed to unauthorized viewers based on viewers' proximity to the display screen, viewers' identity, items containing sensitive information, and a distance from the display screen from which each item containing sensitive information is identifiable. The proposed system and method are presented to determine whether a viewer is authorized to view an item containing sensitive information being displayed on the display screen and whether the viewer is within a distance from the display screen to identify the item containing the sensitive information. The proposed system and method then mask the item containing sensitive information if the viewer is not authorized to view the item containing sensitive information and the viewer is within the distance from the display screen from which the item is identifiable. Therefore, the proposed system and method improve data masking technology, and data privacy and security.

System Components

Figure 1:
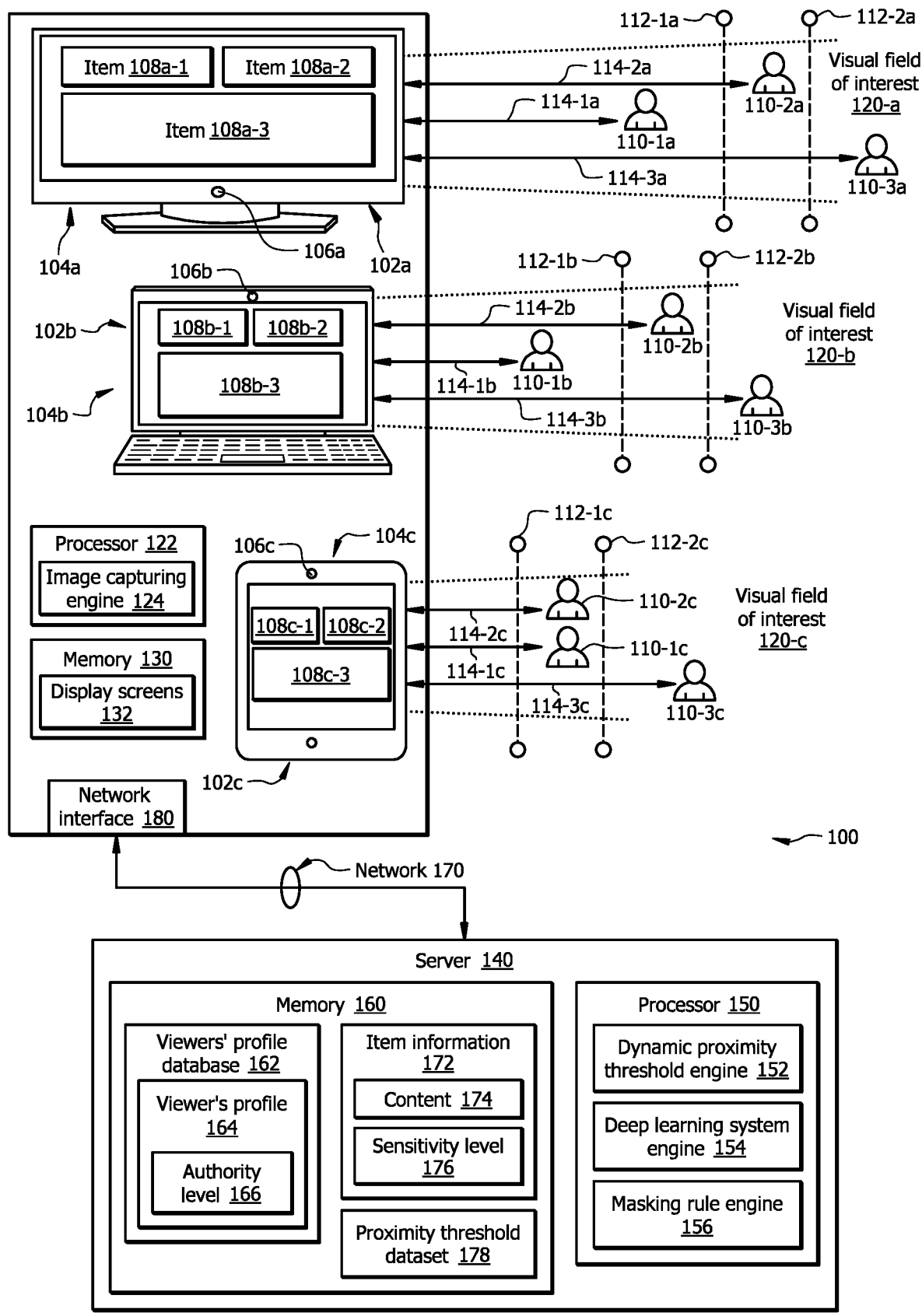
FIG. 1 illustrates one embodiment of a system configured to dynamically mask data on display screens.

FIG. 1 illustrates one embodiment of a system 100 configured to dynamically mask data on display screens. More specifically, system 100 is configured to mask items 108 containing sensitive information to be displayed on a display screen 104 to one or more of viewers 110 who are unauthorized to view such items 108 based on the unauthorized viewers' proximity or distance 114 from the display screen 104, a size of the display screen 104, a sensitivity level 176 of the item 108 containing sensitive information, and/or a content 174 of the item 108 containing sensitive information. In one embodiment, system 100 comprises one or more computing devices or user devices 102a, 102b, or 102c in signal communication with a server 140 by a network interface 180 via a network 170. Each of the user devices 102a, 102b, or 102c comprises a processor 122 that includes an image capturing engine 124 and a memory 130. User devices 102a, 102b, or 102c also include display screens 104a, 104b, and 104c, and cameras 106a, 106b, and 106c, respectively. Server 140 comprises a processor 150 and a memory 160. The processor 150 includes a dynamic proximity threshold engine 152, a deep learning system engine 154, and a masking rule engine 156. In other embodiments, system 100 may not have all the components listed and/or may have other elements instead of, or in addition to, those listed above.

Each of processors 122 and 150 comprises one or more processors operably coupled to the memories 130 and 160, respectively. Each of the processors 122 and 150 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). Each of the processors 122 and 150 may be a programmable logic device, a microcontroller, a microprocessor, or any suitable combination of the preceding. The processor 122 is communicatively coupled to and in signal communication with the memory 130 and network interface 180. The processor 150 is communicatively coupled to and in signal communication with the memory 160 and network interface 180 via network 170. The one or more processors are configured to process data and may be implemented in hardware or software. For example, each of the processors 122 and 150 may be 8-bit, 16-bit, 32-bit, 64-bit, or of any other suitable architecture. Each of the processors 122 and 150 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors is configured to execute instructions to implement the functions disclosed herein, such as some or all of methods 300 and 400. In an embodiment, the function described herein is implemented using logic units, FPGAs, ASICs, DSPs, or any other suitable hardware or electronic circuitry.

Memories 130 and 160 comprise disks, tape drives, or solid-state drives, and may be used as over-flow data storage devices, to store programs when such programs are selected for execution, and to store instructions and data that are read during program execution. The memories 130 and 160 may be volatile or non-volatile and may comprise a read-only memory (ROM), random-access memory (RAM), ternary content-addressable memory (TCAM), dynamic random-access memory (DRAM), and static random-access memory (SRAM). Memory 130 is operable to store display screens 132, and any other data, instructions, logic, rules, or code operable to execute the functions described herein. Memory 160 is operable to store viewers' profile database 162, item information 172, proximity threshold dataset 178, and any other data, instructions, logic, rules, or code operable to execute the functions described herein.

Network interface 180 is operably coupled to processor 122 and configured to enable wired and/or wireless communications. The network interface 180 is configured to communicate data between the system 100 and other network devices, systems, or domain(s). For example, the network interface 180 may comprise a WIFI interface, a local area network (LAN) interface, a wide area network (WAN) interface, a modem, a switch, or a router. The processor 122 is configured to send and receive data using the network interface 180. The network interface 180 may be configured to use any suitable type of communication protocol as would be appreciated by one of ordinary skill in the art.

Image Capturing Engine

Image capturing engine 124 may be provided with or include executable software that is configured to receive images of the viewers 110 within a visual field of interest 120 from camera 106 of user device 102. In the example of user device 102a, the image capturing engine 124 receives images of the viewers 110-1a, 110-2a, and 110-3a within a visual field of interest 120-a of the user device 102a from the camera 106a of the user device 102a. In the example of user device 102b, the image capturing engine 124 receives images of the viewers 110-1b, 110-2b, and 110-3b within a visual field of interest 120-b of the user device 102b from the camera 106b of the user device 102b. In the example of user device 102c, the image capturing engine 124 receives images of the viewers 110-1c, 110-2c, and 110-3c within a visual field of interest 120-c of the user device 102c from the camera 106c of the user device 102c. The image capturing engine 124 is also configured to capture the images of the viewers 110 even while they are in motion. Once the images of the viewers 110 facing the display screen 104 are captured, the image capturing engine 124 may then transmit the received images to a deep learning system engine 154 in server 140 via network 170. The image capturing engine 124 is further configured to detect whether any of the viewers 110 are facing user device 102. The image capturing engine 124 may use any appropriate image classification algorithm to detect whether any of the viewers 110 are facing the user device 102 (e.g., user device 102a, 102b, and 102c). For example, an image classification neural network may be trained by a training dataset that includes viewers' 110 images facing the camera 106 taking the images and facing other directions, where each image is labeled whether the viewer 110 is facing the camera 106 or not based on the location of the eyes of the viewer 110 in each image. The image classification neural network may then be trained by the training dataset to detect whether a viewer (outside the training dataset) is facing the user device 102. In this example, if the viewer's 110 eyes are looking towards the user device 102, the image classification algorithm determines that the viewer 110 is facing the user device 102. In some embodiments, the image capturing engine 124 may also receive the images of the viewers 110 from camera 106 externally connected to the user device. For example, a user device (e.g., user device 102b) may be a laptop connected to a projector, and the items 108 containing sensitive information are transmitted from the laptop to be displayed on the projector. In this example, an external camera 106 may be connected to the laptop, where the external camera 106 is facing viewers facing the projector.

The image capturing engine 124 is also configured to determine distance 114 of each of the viewers 110 from user device 102. In some embodiments, cameras 106 may be 3D cameras that provide information detailing the distance 114 of each viewer 110 from a corresponding user device 102. In other embodiments, the image capturing engine 124 may determine distance 114 of viewer 110 from the user device 102 using trigonometry equations, where distance 114 from the viewer's 110 head to the floor (regardless whether the viewer 110 is standing or sitting) (R), a length of the image of the viewer 110 generated at an image plane inside the camera 106 (r), and a focal length (f) are used as inputs. The focal length (f) is the length from the image plane to a lens of the camera 106 where the image of the viewer 110 on the image plane is in focus as determined by sensors of the camera 106. The image capturing engine 124 may then measure the distance 114 of the viewer 110 to the user device 102 from the point the viewer 110 is in contact with the floor by using the principle of similar triangles. In this method, the image capturing engine 124 generates a one-to-one relationship between the distance 114 of the viewer's 110 head to the floor and the image of the viewer 110 generated at the focal length on the image plane, where the ratio of the length of the image of the viewer 110 (r) to the distance 114 of the viewer's 110 head to the floor (R) is equal to the ratio of focal length (f) to the distance 114 of the viewer 110 from the display screen 104 (d). Thus, using the principle of similar triangles, the distance 114 of the viewer 110 from the display screen 104 (d) may be calculated by:

$$d = f \times (R/r) \quad \text{Equation (1)}$$

With the same method, the image capturing engine 124 may also measure distance 114 of objects from the user device 102 from the point each object touches the floor. In a case where viewer 110 is sitting behind a table, the image capturing engine 124 may determine distance 114 of the table from the user device 102 based on the point the table touched the floor and based on that distance, measure distance 114 of the viewer 110 sitting behind the table by taking a size of the table into account.

In the example of the user device 102a, the image capturing engine 124 determines that distances of viewers 110-1a, 110-2a, and 110-3a from the display screen 104a of the user device 102a are distances 114-1a, 114-2a, and 114-3a, respectively. In the example of the user device 102a, the image capturing engine 124 determines that distances of viewers 110-1b, 110-2b, and 110-3b from the display screen 104b of the user device 102b are distances 114-1b, 114-2b, and 114-3b, respectively. In the example of the user device 102c, the image capturing engine 124 determines that distances of viewers 110-1c, 110-2c, and 110-3c from the display screen 104c of the user device 102c are distances 114-1c, 114-2c, and 114-3c, respectively.

Dynamic Proximity Threshold Engine

Dynamic proximity threshold engine 152 is configured to determine a dynamic proximity threshold 112 of item 108 containing sensitive information based at least in part upon a size of the display screen 104 of the user device 102, a size of the item 108, sensitivity level 176 of the item 108, and/or content 174 of the item 108. The dynamic proximity threshold 112 for the item 108 containing sensitive information is a distance from the display screen 104 from which the item 108 is identifiable. In one embodiment, the dynamic proximity threshold engine 152 determines the dynamic proximity thresholds 112 of each item 108 containing sensitive information using a proximity threshold dataset 178 that includes distances at which a person with a reasonable eyesight is able to identify items 108 with different sizes. The proximity threshold dataset 178 may also include tables for different item contents 174, different item sensitivity levels 176, different display screen 104 sizes, and/or the like. For example, a first table may include distances from display screen 104, from which the same image with different sizes is identifiable. A second table may include distances from display screen 104, from which the same text with different font sizes is identifiable. A third table may include distances from display screen 104, from which the same image with the same size but different resolutions is identifiable. A fourth table may include distances from display screens 104 with different sizes, from which the same image is identifiable. Then, based on these data points, the dynamic proximity threshold engine 152 may determine proximity threshold 112 for an item 108 that has the same or closest data point to a particular datapoint.

In one embodiment, for item 108 with a diagonal size of 5" display screen 104 with a diagonal size of 20", the dynamic proximity threshold engine 152 may search the proximity threshold dataset 178 and find the datapoint in which a proximity threshold of item 108 with a diagonal size of 5" on display screen 104 with a diagonal size of 20" is given. The dynamic proximity threshold engine 152 may also detect the trend in the proximity thresholds for different data points in the proximity threshold dataset 178 and further fill out the proximity threshold dataset 178 for data points that are not currently in the proximity threshold dataset 178. In the above example, if the data point for item 108 with a diagonal size of 5" on display screen 104 with a diagonal size of 20" is not found but the data points for items 108 with diagonal sizes of 4" and 6" on display screen 104 with a diagonal size of 20" are given, the dynamic proximity threshold engine 152 may determine the proximity threshold 112 for this item 108 based on the data point for the item 108 with a diagonal size of 4". Here, the safer option out of the two data points form items 108 with 4" and 6" sizes is to choose the proximity threshold 112 for the item 108 with 4" size because it has a smaller proximity threshold 112 compared to the item 108 with 6" size.

In another embodiment, the dynamic proximity threshold engine 152 may determine the relationship or trend in the proximity thresholds for items 108 smaller than 5" (e.g., 1" to 4") and larger than 5" (6" to 10") and determine an approximate proximity threshold 112 for the item 108 with 5" size that follows the observed trend. In some embodiments, the dynamic proximity threshold engine 152 determines a separate dynamic proximity threshold 112 of every item 108 containing sensitive information on the display screen 104. As such, the dynamic proximity threshold engine 152 may determine more than one dynamic proximity threshold 112 for more than one item 108 containing sensitive information being displayed on the display screen 104. Some examples of datasets to determine dynamic proximity thresholds 112 are described in more detail in TABLE 1 below in conjunction with the operational flow.

As discussed above, dynamic proximity threshold 112 of item 108 containing sensitive information is partly based on the size of display screen 104 on which the item 108 is being displayed. As such, even in a case where the same item 108 is displayed on display screens 104 with different sizes, item 108 is shown larger in the display screen 104 with a larger size. Thus, even though the item 108 is the same, dynamic proximity threshold 112 of the item 108 on the larger display screen 104 is greater than dynamic proximity threshold 112 of the item 108 on the smaller display screen 104. In exemplary illustrations in FIG. 1, assume that items 108a-1 and 108b-1 have the same initial size if displayed on one display screen 104 or they are the same item. The proximity threshold 112-1a for item 108a-1 is greater than the proximity threshold 112-1b for item 108b-1, because the display screen 104a is larger than the display screen 104b, thereby, item 108a-1 is shown larger on display screen 104a and item 108b-1 is shown smaller to fit in display screen 104b.

As discussed above, dynamic proximity threshold 112 for item 108 containing sensitive information is partly based on sensitivity level 176 of the item 108. The sensitivity level 176 of item 108 containing sensitive information indicates how sensitive the item 108 is and which viewers 110 are authorized to view the item 108. The sensitivity level 176 of item 108 may depend on content 174 of the item 108. Within an organization, the sensitivity level 176 of item 108 containing sensitive information is determined by how valuable the sensitive information to the organization is. In some examples, if sensitivity level 176 of a first item (e.g., item 108a-1) is high and sensitivity level 176 of a second item (e.g., item 108a-2) is low, the dynamic proximity threshold engine 152 may determine shorter distance 114 for dynamic proximity threshold 112 for the first item compared to the second item. With this approach, the confidence level in securing and protecting the highly sensitive information in items 108 with high sensitivity level 176 is increased. The sensitivity levels 176 of items 108 containing sensitive information are explained in detail below in conjunction with the operational flow.

Deep Learning System Engine

Once the images of viewers 110 are captured by the image capturing engine 124, the image capturing engine 124 sends those images to the deep learning system engine 154. The deep learning system engine 154 is configured to identify the viewers 110 using any suitable facial recognition algorithm. In one embodiment, the deep learning system engine 154 identifies the viewers 110 by searching for each viewer's 110 image in viewer's profile database 162 in memory 160, and for each of the viewers 110, matching viewer's 110 image to one of the stored viewer's profiles 164. The viewers' profile database 162 in memory 160 includes viewers' authority level 166 that indicates which items 108 containing sensitive information, the viewer 110 is authorized to view. For example, a first viewer among viewers 110 with a low authority level 166 is authorized to view items 108 with a low sensitivity level 176. A second viewer among viewers 110 with a high authority level 166 is authorized to view items 108 with low to high sensitivity levels 176. The authority level 166 of each viewer 110 may be stored in his/her viewer's profile 164. Once the deep learning system engine 154 determines the identity of viewer 110, the deep learning system engine 154 searches the viewers' profile database 162 and matches the viewer's 110 image to one of the viewers' profiles 164.

Then, based on the authority level 166 of each viewer 110 and the sensitivity level 176 of each item 108 containing sensitive information, the deep learning system engine 154 determines whether each viewer 110 is authorized to view each item 108 containing sensitive information. In the example of viewer 110-1a, based on the authority level 166 of viewer 110-1a and the sensitivity levels 176 of the items 108a-1 and 108a-3 that are containing sensitive information, the deep learning system engine 154 determines whether viewer 110-1a is authorized to view items 108a-1 and/or 108a-3. In a case where the deep learning system engine 154 could not identify a particular viewer among viewers 110, the deep learning system engine 154 determines that the authority level 166 of the particular viewer is non-existent or low, and the particular viewer is only authorized to view items 108 with low sensitivity level 176, such as public information.

Masking Rule Engine

Masking rule engine 156 is configured to receive the dynamic proximity thresholds of items 108 containing sensitive information from the dynamic proximity threshold engine 152, information regarding whether each of the viewers 110 in the visual field of interest 120 is authorized to view each of the items 108 containing sensitive information from the deep learning system engine 154, and the distance 114 of each of the viewers 110 from the image capturing engine 124 via network 170. Then, based on this received information, the masking rule engine 156 is configured to dynamically mask an item 108 containing sensitive information if at least one viewer among viewers 110 is at distance 114 that is within a dynamic proximity threshold 112 of item 108 containing sensitive information and that viewer is not authorized to view the item 108. In the example of items 108a-1, 108a-2, and 108a-3 displaying on user device 102a where only the items 108a-1 and 108a-3 contain sensitive information, the masking rule engine 156 receives the proximity threshold 112-1a for item 108a-1 and the proximity threshold 112-2a for item 108a-3 from the dynamic proximity threshold engine 152. The masking rule engine 156 also receives information regarding whether each of the viewers 110-1a, 110-2a, and 110-3a are authorized to view each of the items 108a-1 and 108a-3 from the deep learning system engine 154. The masking rule engine 156 also receives the distances 114 of each of viewers 110-1a, 110-2a, and 110-3a from the image capturing engine 124 via network 170. Based on this received information, masking rule engine 156 determines whether to mask any of the items 108a-1 and 108a-3.

In some embodiments, the masking rule engine 156 may mask the items 108 containing sensitive information with different methods and rules. In some examples, the masking rule engine 156 may scramble at least a portion of the item 108 containing sensitive information with a string of "XXX". In some examples, the masking rule engine 156 may substitute the item 108 containing sensitive information with another item that the viewers 110 are authorized to view. In some examples, the masking rule engine 156 may vary the item 108 containing sensitive information by a numeric variance applied to the item 108, so that it still shows a meaningful range of data set but not the actual data set containing sensitive information. For example, in an example of masking financial data set such as payroll information, the masking rule engine 156 may utilize a +/−10% variance to the payroll information, such that it still shows a meaningful and relevant range in the payroll without displaying the actual payroll information. In some examples, the masking rule engine 156 may use an encryption method with a key to mask the item 108 containing sensitive information. In this method, a user may use the key to decrypt or unmask the item 108. The key may be a password that is set by a user or an administrator of the sensitive information stored in item information 172. For example, the masking rule engine 156 may mask the item 108 containing sensitive information by displaying "encrypted item-1" instead of the actual item 108. When a user clicks on the item 108, the encryption method may pop up a window box asking for a key to decrypt the masked item 108. If the user inputs the key for this item 108 correctly, the original item 108 may be displayed. In some examples, the masking rule engine 156 may delete the item 108 containing sensitive information from displaying. In some examples, the masking rule engine 156 may block at least a portion of the item 108 containing sensitive information with a filled shape such as portions 202-206 shown in FIGS. 2A and 2B. In some examples, the masking rule engine 156 may modify a background of the item 108 containing sensitive information in addition to deleting the item 108. In some examples, the masking rule engine 156 may reduce the size of the item 108 containing sensitive information until the selected item 108 is not identifiable to the viewers unauthorized to view the item 108. In some examples, the masking rule engine 156 may blur at least a portion of the item 108.

In some embodiments, the masking rule engine 156 is configured to determine masking configurations of items 108 containing sensitive information in real-time at time intervals (e.g., every second, every few seconds, or other suitable time periods). In the example of items 108*a*-1, 108*a*-2 and 108*a*-3 displaying on user device 102*a*, the display screen 104*a* of user device 102*a* may display items 108*a*-1, 108*a*-2 and 108*a*-3 at a time t=1 s. The masking rule engine 156 determines a first masking configuration of items 108*a*-1, 108*a*-2 and 108*a*-3 based on the current viewers' (viewers 110-1*a*, 110-2*a*, and 110-3*a*) identity, authority level 166, their distances 114 from the display screen 104*a*, and sensitivity levels 176 of items 108*a*-1, 108*a*-2 and 108*a*-3. The masking rule engine 156 then transmits the first masking configuration of items 108*a*-1, 108*a*-2 and 108*a*-3 at t=1 s to the user device 102*a* via network 170, so that the display screen 104*a* of user device 102*a* be modified based on the first masking configuration at t=1 s (i.e., the display screen 104*a* of user device 102*a* be synchronized with the first masking configuration at t=1 s). In this example, the user device 102*a* may display other items at the next time interval, e.g., at time t=2 s. The masking rule engine 156 determines a second masking configuration of the other items based on viewers present at the t=2 s information and viewers' distances 114 from the display screen 104*a* of user device 102*a*, and sensitivity levels 176 of the other items. The masking rule engine 156 then transmits the second masking configuration of the other items at t=2 s to the user device 102*a* via network 170, so that the display screen 104*a* of user device 102*a* can be modified based on the second masking configuration at t=2 s (i.e., the display screen 104*a* of user device 102*a* be synchronized with the second masking configuration at t=2 s). The masking rule engine 156 may be configured to store these masking configurations at different time intervals in memory 130. For example, the masking rule engine 156 stores the first masking configuration at t=1 s and the second masking configuration at t=2 s in display screens 132 in memory 130. In some embodiments, the time intervals of masking configurations may be configurable based on a frequency of changes in items 108 and/or a rate of changes in items 108 being displayed on display screen 104 of a user device 102. For example, if the items 108 being displayed on the display screen 104 are changed every minute, the masking configurations may be determined every 30 seconds.

Network

The network 170 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 170 may be configured to support any suitable type of communication protocol as would be appreciated by one of ordinary skill in the art.

Operational Flow

In general, system 100 facilitates protecting sensitive or confidential information to be exposed or displayed on display screen 104 of user device 102 (e.g., any of user devices 102*a*, 102*b*, and 102*c*) to any viewer among viewers 110 who is not authorized to view the sensitive information. The system 100 first identifies viewers 110 facing user devices 102 and their authority levels 166 which are stored in memory 160, and determines their distances 114 from user devices 102. The system 100 then identifies items 108 containing sensitive information and for each of the items 108 containing sensitive information, determines their sensitivity level 176 stored in memory 160. The system 100 then determines dynamic proximity threshold 112 for each of the items 108 containing sensitive information based on a size of the display screen 104, a size of the item 108 containing sensitive information, sensitivity level 176 of the item 108, and/or content 174 of the item 108. The dynamic proximity threshold 112 for item 108 is a distance from a display screen 104 of each of user devices 102 from which the item 108 is identifiable. The system 100 then masks the item 108 containing sensitive information if at least one viewer 110 is at a distance that is within the dynamic proximity threshold 112 of the item 108 and is not authorized to view the item 108. Throughout this process, the system 100 is able to protect the sensitive information from being exposed or displayed to viewers 110 who are not authorized to view that sensitive information. The system 100 may be configured as shown or in any other suitable configuration. Each of user devices 102*a*, 102*b*, and 102*c* is generally a computing device that is operable to communicate with other computing devices via network 170 and is operable to display information on its display screen, such as display screens 104*a*, 104*b*, and 104*c* for user devices 102*a*, 102*b*, and 102*c*, respectively. Typically, each of user devices 102*a*, 102*b*, and 102*c* includes a data processing system comprising hardware and software that supports displaying information and communicates with the other network elements over a network, such as the Internet, an intranet, an extranet, a private network, or any other medium or link. These data processing systems typically include one or more processors, an operating system, one or more applications, and one or more utilities. Each of the user devices 102*a*, 102*b*, and 102*c* includes a processor 122, a memory 130, and a camera or a webcam, e.g., cameras 106*a*, 106*b*, 106*c*, respectively. Applications running on the data processing systems provide native support for displaying information. Examples of user devices 102*a*, 102*b*, and 102*c* include, but are not limited to, desktop computers, mobile phones, tablet computers, laptop computers, or any other suitable type of device.

Each of the user devices 102a, 102b, and 102c may display information to one or more viewers 110. In some embodiments, an image of each viewer 110 is captured by camera 106 connected to the user device 102 to identify each viewer 110. The camera 106 may be programmed by the image capturing engine 124 to focus on the faces of the viewers 110. The image capturing engine 124 may also determine whether each viewer 110 is facing a display screen 104 of the user device 102 by using a facial recognition algorithm, where the facial recognition algorithm determines whether viewer 110 is looking at the display screen 104 by tracking eye movements of the viewer 110.

Once the images of viewers 110 facing the display screen 104 of the user device 102 are captured, the identity of each viewer 110 is determined by the deep learning system engine 154. In a case where the one or more viewers 110 are employees of an organization, each of the one or more viewers 110 has a viewer's profile (e.g., viewer's profile 164) stored in viewers' profile database 162. In one embodiment, the viewers 110 are identified by searching the viewers' profile database 162 and for each viewer 110, matching the viewer's 110 image to one of the viewer's profile 164. In some embodiments, the viewers 110 may be identified by their identifier from, for example, their organization identification (ID) badge, smartphone, smartwatch, and/or the like.

In an organization, each viewer 110 may have authority level 166 that indicates whether the viewer 110 is authorized to view an item from items 108 with sensitive information, where the organization determines what constitutes sensitive information. Some examples of sensitive information may include personal information of employees, bank account numbers, a newly developed algorithm by engineers of the organization, and/or the like. The authority level 166 of each viewer 110 is stored in each of the viewer's profile 164, such as in authority level 166. In some examples, an authority level 166 of viewer 110 to view item 108 contains sensitive information is determined by the organization based on whether the viewer 110 is known to the organization and/or a position of the viewer 110 in the organization. For example, if a first viewer (e.g., viewer 110-1a) is an entry-level employee of the organization, the first viewer may have a first authority level 166 stored in the first viewer's profile 164, where the first authority level 166 may indicate that the first viewer is only authorized to view items 108 with public information. In another example, if a second viewer (e.g., viewer 110-2a) is a manager of the organization, the second viewer may have a second authority level 166 stored in the second viewer's profile 164, where the second authority level 166 may indicate that the second viewer is authorized to view every item 108 containing sensitive information.

Each viewer 110 may be positioned a different distance 114 from the user device 102. In one embodiment, the image capturing engine 124 may determine distance 114 of each viewer 110 from the user device 102 from the point each viewer 110 is in contact with the floor using trigonometry equations. As shown in FIG. 1, in an example of user device 102a displaying items 108a-1, 108a-2, and 108a-3, viewers 110-1a, 110-2a, and 110-3a are at different distances from the user device 102a. In this example, the image capturing engine 124 determines that the distances of viewers 110-1a, 110-2a, are 110-3a are 114-1a, 114-2a, and 114-3a, respectively, from the user device 102a.

In some cases, multiple items 108 may be displayed on display screen 104 of a user device 102. One or more items 108 displayed on the display screen 104 may include sensitive or confidential information such as account information, personal information, software code, etc. The content 174 of each item 108 containing sensitive information is stored in its item information 172 in memory 160. For example, the content 174 of item 108a-1 which contains sensitive information may be stored in content 174. The system 100, e.g., in dynamic proximity threshold engine 152 identifies the items 108 containing sensitive information on the display screen 104 of the user device 102 by searching the item information 172 and matching each sensitive information on the display screen 104 to one of sensitive information stored in item information 172.

Each item 108 containing sensitive information is associated with a sensitivity level (e.g., sensitivity level 176) which is also stored in its item information 172 in memory 160. In some embodiments, the sensitivity level 176 of item 108 containing sensitive information is determined based on the content 174 of the item 108, its relevance to the current related technologies, and/or the like. For example, if a first item (e.g., item 108a-1) is a code that contains a recently developed algorithm, the first item will be associated with a high security level 176. In another example, if a second item (e.g., item 108a-2) is a code that contains an algorithm taken from a published paper, the second item will be associated with a low security level 176. In some examples, if the sensitivity level 176 of the item 108 is low, it indicates that the item 108 is not sensitive, e.g., the item 108 is public information. If the sensitivity level 176 of the item 108 is medium, it indicates that the item 108 is sensitive and only a selected group of viewers among viewers 110 may be authorized to view the item 108, for example, employees of a particular department in an organization are authorized to view the item 108. If the sensitivity level 176 of the item 108 is high, it indicates that the item 108 is highly sensitive and a few selected group of viewers among viewers 110 are authorized to view the item 108, for example only managers of a particular department are authorized to view the item 108.

The dynamic proximity threshold 112 for each item 108 containing sensitive information is a distance from the display screen 104 from which the item 108 is identifiable. The dynamic proximity threshold 112 for item 108 containing sensitive information that is displayed on a user device 102 is determined by the dynamic proximity threshold engine 152 based on a size of the item 108, a size of the display screen 104, sensitivity level 176 of the item 108, and/or a content 174 of the item 108. In one embodiment, dynamic proximity thresholds 112 of each item 108 containing sensitive information are determined using the proximity threshold dataset 178 to determine distances from the user device 102 from which each item 108 containing sensitive information is identifiable. The proximity threshold dataset 178 may include measured proximity thresholds for different item 108 sizes, different display screen 104 sizes, different sensitivity levels 176 of items 108, and/or items 108 with different contents 174. Then, based on the data points from the proximity threshold dataset 178, the dynamic proximity threshold engine 152 may calculate proximity thresholds for different items 108 that may not be in the proximity threshold dataset 178. The calculated proximity threshold 112 for item 108 not in the dataset may be added to the proximity threshold dataset 178 to further add data points to the proximity threshold dataset 178.

For example, TABLE 1 illustrates an exemplary dataset of measured proximity thresholds 112 for items 108 with two diagonal sizes being displayed on a 5" display screen 104, where each item 108 has a different sensitivity level 176. TABLE 1 described here is illustrative only and is not meant to limit the scope of the invention or its embodiments.

TABLE 1

Example dataset.

| Item No. | Item's 108 size (inches) | Item's sensitivity level 176 | Display screen's 104 size (inches) | Proximity threshold 112 (feet) |
| --- | --- | --- | --- | --- |
| 1 | 1" | Low | 5" | 1' |
| 2 | 1" | Medium | 5" | 0.8' |
| 3 | 1" | High | 5" | 0.6' |
| 4 | 2" | Low | 5" | 1.1' |
| 5 | 2" | Medium | 5" | 0.9' |
| 6 | 2" | High | 5" | 0.7' |

As illustrated in TABLE 1, items 108 with the same size may have different proximity thresholds 112 based on their sensitivity levels 176. For example, items No. 1-3 have the same size of 1", however, the proximity threshold of item No. 1 is greater than item No. 2, and the proximity threshold of item No. 2 is greater than item No. 3. If item 108 has a higher sensitivity level 176, i.e., the item 108 contains highly sensitive information, the proximity threshold 112 of the item 108 should be more stringent compared to an item 108 with the same size and lower sensitivity level 176. In this example, the proximity threshold 112 for items 108 with medium and high sensitivity levels 176 are increased by 0.2' and 0.4' compared to their corresponding items 108. In another example, this increment may be a different value for each of the items 108 with medium and high sensitivity levels 176 (e.g., 0.3" for items 108 with medium and 0.5' for items 108 with high sensitivity levels 176). These increments to the proximity thresholds for items 108 with medium and high sensitivity levels 176 may be set by an administrator. One advantage of this approach is to increase a confidence level in securing and protecting highly sensitive information in item 108 with a high sensitivity level 176 from being exposed. The proximity threshold dataset 178 may include other tables for display screens 104 with other sizes, items 108 with other sizes, where the items 108 have different sensitivity levels 176.

In some embodiments, in determining proximity threshold 112 for item 108 containing sensitive information being displayed on a display screen 104, a size of the item 108, a size of the display screen 104, and sensitivity level 176 of the item 108 may be weighted or multiplied with different digits to prioritize one or two of the size of the item 108, the size of the display screen 104, and the sensitivity level 176 of the item 108 over the others. In some examples, in determining proximity threshold 112 for item 108 containing sensitive information being displayed on a display screen 104, sensitivity level 176 of item 108 may be given a higher priority compared to a size of the item 108 and a size of the display screen 104. As such, the sensitivity level 176 of item 108 may be weighted or multiplied with a higher digit (e.g., 2), and the size of the item 108 and the size of the display screen 104 may be weighted or multiplied with a lower digit (e.g., 1).

If the item 108 containing sensitive information comprises an image or a video, the dynamic proximity threshold 112 of the item 108 is determined can be further based on a resolution of the item 108. Thus, the proximity threshold dataset 178 may also include other tables for items 108 with different resolutions. For example, consider a first item (e.g., item 108a-1) is an image with a 4" diagonal size with a high resolution, e.g., 300 dots per inch (DPI) displaying on display screen 104a with a 20" diagonal size. The dynamic proximity threshold engine 152 may determine proximity threshold 112-1a for the first item. Now, consider a second item (e.g., item 108a-2) is an image with the same 4" diagonal size with a low resolution, e.g., 10 DPI displaying on display screen 104a with a 20" diagonal size. The dynamic proximity threshold engine 152 may determine a second proximity threshold 112 for the second item. In this example, the first item is identifiable from a further distance 114 from the display screen 104a compared to the second item because the first item has a higher resolution than the second item. Thus, the proximity threshold 112-1a is further away from the display screen 104a than the proximity threshold 112-1b, even though the first item and the second item have the same size and are being displayed on the same display screen 104a.

In FIG. 1, non-limiting examples of determining dynamic proximity thresholds 112 for different items 108 containing sensitive information being displayed on display screens 104 of user devices 102 are shown. In an example of item 108a-1 on display screen 104a of user device 102a, the dynamic proximity threshold engine 152 determines that item 108a-1 contains sensitive information from 174 content and sensitivity level 176 of the item 108a-1. Then, the dynamic proximity threshold engine 152 determines a proximity threshold 112-1a for item 108a-1 from the display screen 104a of user device 102a by using proximity threshold dataset 178 based on a size of the item 108a-1, a size of the display screen 104a, sensitivity level 176 of the item 108a-1, and/or content 174 of the item 108a-1. In an example of item 108a-2 on display screen 104a of user device 102a, the dynamic proximity threshold engine 152 may determine that item 108a-2 does not contain sensitive information from the content and sensitivity level of the item 108a-2. Thus, no proximity threshold would be determined for item 108a-2. In an example of item 108a-3 on display screen 104a of user device 102a, the dynamic proximity threshold engine 152 determines that item 108a-3 contains sensitive information from content 174 and sensitivity level 176 of the item 108a-2. Then, the dynamic proximity threshold engine 152 determines a proximity threshold 112-2a for item 108a-3 from the display screen 104a of user device 102a by using proximity threshold dataset 178 based on a size of the item 108a-3, a size of the display screen 104a, sensitivity level 176 of the item 108a-3, and content 174 of the item 108a-3.

As can be observed from the these particular examples, the proximity threshold 112-1a for item 108a-1 is at a smaller distance from the display screen 104a compared to the proximity threshold 112-2a for item 108a-3, partly because the size of item 108a-3 is larger than the size of item 108a-1 and/or item 108a-3 has a higher resolution than item 108a-1. In an example of item 108b-1 on display screen 104b of user device 102b, the dynamic proximity threshold engine 152 determines that item 108b-1 contains sensitive information from the content 174 and sensitivity level 176 of the item 108a-1. Then, the dynamic proximity threshold engine 152 determines a proximity threshold 112-1b for item 108b-1 from the display screen 104b of user device 102b by using proximity threshold dataset 178 based on the size of the item 108b-1, the size of the display screen 104b, the sensitivity level 176 of the item 108b-1, and the content 174 of the item 108b-1.

As can be observed from the above examples, the proximity thresholds 112-1b and 112-2b of items 108b-1 and 108b-3 from display screen 104a are smaller compared to the proximity thresholds 112-1a and 112-2a of items 108a-1 and 108a-3 from display screen 104b. This is because the size of the display screen 104a is larger than the display screen 104b. Thus, when the items are displayed on full-screen mode, even two items (e.g., items 108a-1 and item 108b-1) with the same initial size are displayed or shown with different sizes on display screens with different sizes (e.g., display screen 104a and 104b).

Item 108 containing sensitive information on display screen 104 of user device 102 is masked by masking rule engine 156 if at least one viewer is at a distance that is within the dynamic proximity threshold of the item 108 and is not authorized to view the item 108. In some embodiments, the masking rule engine 156 may mask the items 108 containing sensitive information with different methods and rules explained above. As illustrated in FIG. 1, assuming that items 108a-1 and 108a-3 contain sensitive information and item 108a-2 does not, proximity thresholds 112-1a and 112-2a are illustrated for items 108a-1 and 108a-3, respectively. Viewer 110-1a is within the proximity threshold 112-1a of item 108a-1. Viewers 110-1a and 110-2a are within the proximity threshold 112-2a of item 108a-3. Viewer 110-3a is outside both of proximity thresholds 112-1a and 112-2a of items 108a-1 and 108a-3, respectively. Based on this information, the masking rule engine 156 masks item 108a-1 if viewer 110-1a is not authorized to view item 108a-1. The masking rule engine 156 may also mask item 108a-3 if either of viewers 110-1a or 110-2a is not authorized to view item 108a-3. In this example, if viewer 110-1a is authorized to view item 108a-1, and either of viewers 110-2a or 110-3a is not authorized to view item 108a-1, the masking rule engine 156 does not mask item 108a-1 because each of viewers 110-2a and 110-3a is at a distance from user device 102a that is greater than proximity threshold 112-1a (i.e., each of viewers 110-2a and 110-3a is at the distance from user device 102a from which item 108a-1 is not identifiable.). Similarly, if both of viewers 110-1a and 110-2a are authorized to view item 108a-3 while viewer 110-3a is not, the masking rule engine 156 does not mask item 108a-3 because viewer 110-3a is at a distance from user device 102a that is greater than proximity threshold 112-2a (i.e., viewer 110-3a is at the distance from user device 102a from which item 108a-3 is not identifiable.).

As further illustrated in FIG. 1, assuming that items 108b-1 and 108b-2 have the same size, but item 108b-1 has a higher resolution than item 108b-2, both items 108b-1 and 108b-2 contain sensitive information, and item 108b-3 does not contain sensitive information, proximity thresholds 112-1b and 112-2b are illustrated for items 108b-1 and 108b-2, respectively. Viewer 110-1b is within the proximity threshold 112-1b of item 108b-1. Viewers 110-1b and 110-2b are within the proximity threshold 112-2b of item 108a-2. Viewer 110-3a is outside both of proximity thresholds 112-1b and 112-2b of items 108b-1 and 108b-2, respectively. Based on this information, the masking rule engine 156 masks item 108b-1 if viewer 110-1b is not authorized to view item 108b-1. The masking rule engine 156 may also mask item 108b-2 if either of viewers 110-1b or 110-2b is not authorized to view item 108b-2. In this example, if viewer 110-1b is authorized to view item 108b-1, and either of viewers 110-2b or 110-3b is not authorized to view item 108b-1, the masking rule engine 156 does not mask item 108b-1 because each of viewers 110-2b and 110-3b is at a distance from user device 102b that is greater than proximity threshold 112-1b (i.e., each of viewers 110-2b and 110-3b is at distances 114-2b and 114-3b, respectively from user device 102b from which item 108b-1 is not identifiable.). Similarly, if both of viewers 110-1b and 110-2b are authorized to view item 108b-2 while viewer 110-3b is not, the masking rule engine 156 does not mask item 108b-2 because viewer 110-3b is at a distance from user device 102b that is greater than proximity threshold 112-2b (i.e., viewer 110-3b is at the distance 114-3b from user device 102b from which item 108b-2 is not identifiable.).

As further illustrated in FIG. 1, assuming that items 108c-1 and 108c-3 contain sensitive information and item 108c-2 does not, proximity thresholds 112-1c and 112-2c are illustrated for items 108c-1 and 108c-2, respectively. Viewers 110-1c and 110-2c are outside the proximity threshold 112-1c and within the proximity threshold 112-2c. Viewer 110-3c is outside either of proximity thresholds 112-1c and 112-2c. Based on this information, the masking rule engine 156 masks item 108c-3, if either of viewers 110-1c and 110-2c are not authorized to view this item. In this particular example, the masking rule engine 156 does not mask item 108c-1 regardless of authority levels 166 of viewers 110-1c, 110-2c, and 110-3c because they are not within the proximity threshold 112-1c of item 108c-1 (i.e., they are not at a distance from user device 102c that they could identify the item 108c-1.)

In some embodiments, a masked item 108 may be unmasked by masking rule engine 156 if all viewers 110 who are within the proximity threshold 112 of the masked item 108 move beyond the proximity threshold of the masked item 108 from the user device 102. In the example of masked item 108a-1 with proximity threshold 112-1a, assume that viewer 110-1a does not have an authority to view this item. If viewer 110-1a moves away from user device 102a such that he/she is outside proximity threshold 112-1a, the masking rule engine 156 unmasks item 108a-1 because there is no viewer 110 left within the proximity threshold 112-1a of item 108a-1.

In some embodiments, masked item 108 may be unmasked by masking rule engine 156 if the sensitivity level 176 of the masked item 108 is lowered such that viewers 110 who are within the proximity threshold of the masked item 108 would be authorized to view the masked item 108. In the example of masked item 108a-1 with proximity threshold 112-1a, assume that viewer 110-1a does not have an authority to view this item. If the sensitivity level 176 of item 108a-1 is reduced such that viewer 110-1a is now authorized to view this item, for example, after publishing the sensitive information in item 108a-1, the masking rule engine 156 may unmask item 108a-1.

In some embodiments, a masked item may be unmasked by masking rule engine 156 if authority levels 166 of viewers 110 who are within the proximity threshold 112 of the masked item 108 is increased such that they would be authorized to view the masked item 108. In the example of masked item 108c-3 with proximity threshold 112-2c, assume that viewers 110-1c and 110-2c do not have an authority to view this item. If the authority levels 166 of both these viewers 110 are increased such that they are authorized to view item 108c-3, for example, an administrator changed their authority levels 166 in their viewer's profiles 164, the masking rule engine 156 unmasks item 108c3 since viewers 110-1c and 110-2c are now authorized to view item 108c-3.

Examples of Data Masking

Two examples of masking sensitive information on display screens are illustrated in FIGS. 2A and 2B. In FIG. 2A, a display screen 208 is illustrated displaying a software code to one or more viewers 110. In this illustration, a portion 202 of the software code that contains sensitive information is masked as a result of the masking rule engine 156 determining that at least one viewer (e.g., from viewers 110) is at a distance within dynamic proximity threshold 112 of portion 202 and that viewer is not authorized to view the portion 202. In this example, the display screen 208 may correspond to any of the display screens 104 of user devices 102a, 102b, and 102c. Also, portion 202 may correspond to a portion of any items 108a-1, 108a-2 or 108a-3 in FIG. 1 that may comprise sensitive information that viewer is not authorized to view.

In FIG. 2B, a display screen 210 is illustrated displaying an application to one or more viewers 110. In this illustration, portions 204 and 206 of the application that contain sensitive information are masked as a result of the masking rule engine 156 determining that at least one viewer (e.g., from viewers 110) is at distance within dynamic proximity thresholds 112 of portions 204 and 206 and that viewer is not authorized to view the portions 204 and 206. In this example, the display screen 210 may correspond to any of the display screens of user devices 102a, 102b, and 102c. Also, portions 204 and 206 may correspond to portions of any items 108a-1, 108a-2 or 108a-3 in FIG. 1 that may comprise sensitive information that viewer is not authorized to view.

Example of a Method for Data Masking

Figure 3:
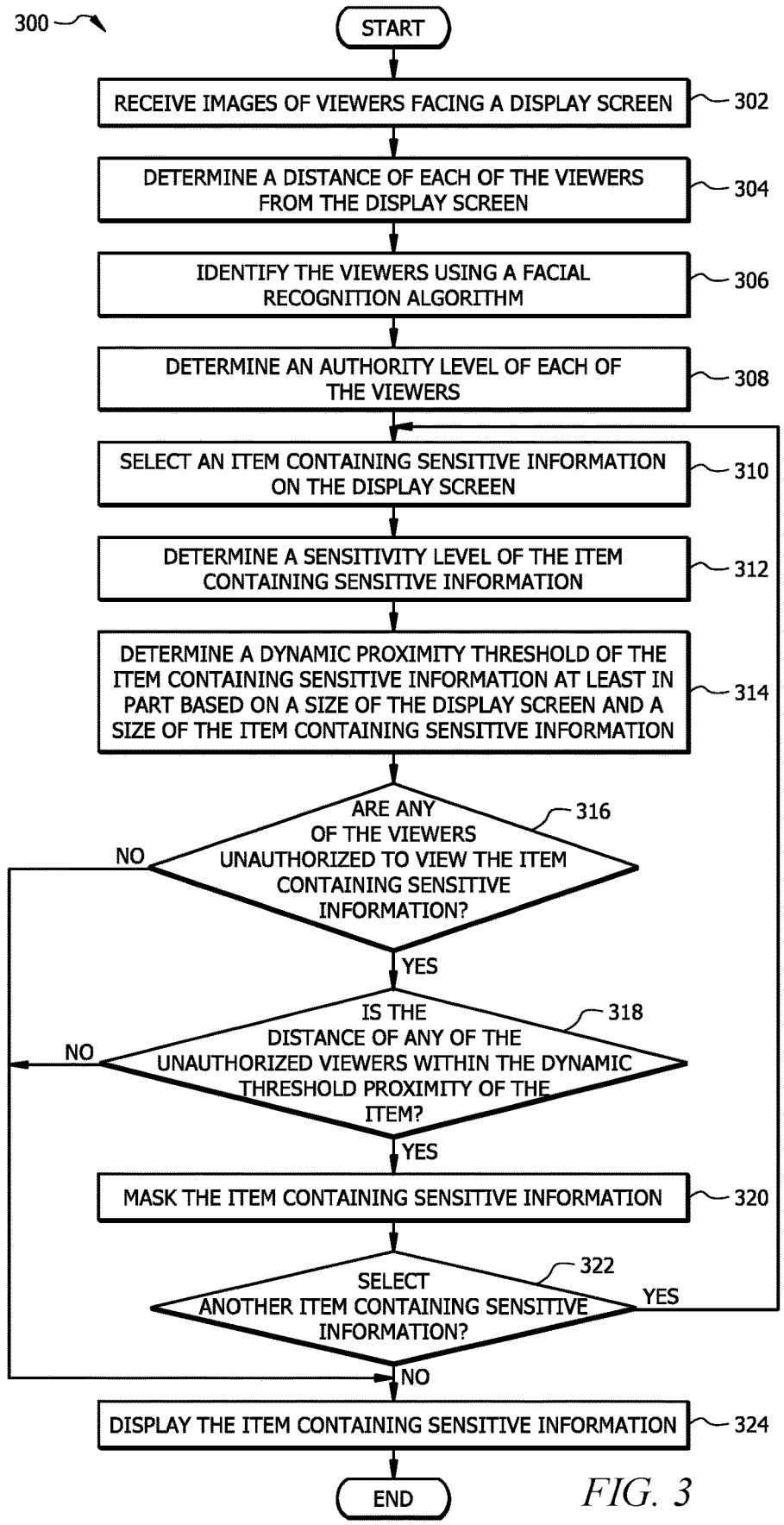
FIG. 3 illustrates an example flow chart of a method of dynamically masking data on display screens.

FIG. 3 illustrates an example flow chart of a method 300 of dynamically masking items 108 containing sensitive information on display screen 104 of user device 102 (e.g., any of user devices 102a, 102b, and 102c). One or more of steps 302-324 of the method 300 may be implemented, at least in part, in the form of executable code stored on non-transitory, tangible, machine-readable media that when run by one or more processors may cause the one or more processors to perform one or more of the steps 302-324. In some embodiments, method 300 can be performed by any of user devices 102 in systems 100 of FIG. 1, including the image capturing engine 124, the dynamic proximity threshold engine 152, the deep learning system engine 154, and/or the masking rule engine 156. Aspects of the steps 302-324 of method 300 have been covered in the description for FIGS. 1 and 2; and additional aspects are provided below.

The method 300 begins at step 302 where the image capturing engine 124 receives images of viewers 110 facing display screen 104 of user device 102 (e.g., any of display screens 104a, 104b, 104c of user devices 102a, 102b, and 102c). The image capturing engine 124 may receive the images of the viewers 110 from webcam or camera 106 of the user device 102 (e.g., any of cameras 106a, 106b, 106c), or an external camera 106 connected to the user device 102. The image capturing engine 124 receives the images of viewers 110 even while the viewers 110 are moving. At step 304, the image capturing engine 124 determines distance 114 of each of the viewers 110 from the display screen 104. In one embodiment, the image capturing engine 124 may determine distance 114 of each viewer 110 from the user device 102 using trigonometry equations to measure distances 114 of viewers 110 from the user device 102, from the point each viewer 110 is in contact with the floor. In the example of user device 102a, the image capturing engine 124 determines the distances 114-1a, 114-2a, and 114-3a for viewers 110-1a, 110-2a, and 110-3a from the display screen 104a of user device 102a, respectively.

At step 306, the deep learning system engine 154 identifies the viewers 110 using any appropriate facial recognition algorithm. In some embodiments, the deep learning system engine 154 may identify the viewers 110 by searching the viewers' profile database 162 stored in memory 160 and for each of the viewers 110 and matching the viewer's 110 image to one of the viewers' 110 profiles (e.g., viewer's profile 164).

At step 308, the deep learning system engine 154 determines authority level 166 of each of the viewers 110 from each viewer's profile 164. In an organization, the authority levels 166 of the viewers 110 may be related to departments in which the viewers 110 are working, positions of the viewers 110 in the organization, and/or the like. For example, in an organization, a first viewer among viewers 110 (e.g., an entry-level employee of the organization) may have a low authority level 166. Thus, deep learning system engine 154 may determine that the first viewer is only authorized to view items 108 containing sensitive information with low sensitivity level 176. In another example, a second viewer among viewers 110 (e.g., a mid-level employee of the organization) may have a medium authority level 166. Thus, deep learning system engine 154 may determine that the second viewer is authorized to view items 108 containing sensitive information with low and medium sensitivity levels 176. In another example, a third viewer among viewers 110 (e.g., a manager of a department of the organization) may have a high authority level 166. Thus, deep learning system engine 154 may determine that the third viewer is authorized to view items 108 containing sensitive information with low, medium, and high sensitivity levels 176.

At step 310, the dynamic proximity threshold engine 152 selects an item containing sensitive information from among the items 108 containing sensitive information. The dynamic proximity threshold engine 152 iteratively selects items containing sensitive information from among the items 108 containing sensitive information to evaluate. The items 108 containing sensitive information may comprise a text, an image, a video, and/or the like. The dynamic proximity threshold engine 152 may select each item 108 being displayed on the display screen 104 of the user device 102 and check whether it matches an item that contains sensitive information stored in item information 172 using an image processing algorithm. The image processing algorithm may search through the items containing sensitive information stored in the item information 172 and match an item among them to the selected item 108 on the display screen 104. For example, the dynamic proximity threshold engine 152 may select item 108a-1 from FIG. 1 and using the image processing algorithm determine whether item 108a-1 is among the items 108 containing sensitive information stored in the item information 172.

At step 312, the dynamic proximity threshold engine 152 determines a sensitivity level of the selected item 108 containing sensitive information from the sensitivity level 176 of the item 108 stored in item information 172. In some embodiments, the sensitivity level 176 of item 108 containing sensitive information is determined based on the content 174 of the item 108, its relevance to the current related technologies, and/or the like.

At step 414, the dynamic proximity threshold engine 152 determines dynamic proximity threshold 112 for the selected item 108 containing sensitive information based at least in part upon a size of the display screen 104 of the user device 102, a size of the selected item 108, content 174 of the selected item 108, and/or sensitivity level 176 of the selected item 108. The dynamic proximity threshold 112 of the selected item 108 is a distance from the display screen 104 from which the selected item 108 is identifiable. For example, if the size of the selected item 108 is small (e.g., 3"×4") and the size of the display screen 104 is large (e.g., 30"×40"), the distance from the display screen 104 that the selected item 108 is identifiable may be close to the display screen 104 (e.g., 2 feet). In the example of item 108a-1 as the selected item 108 containing sensitive information, the dynamic proximity threshold engine 152 determines the proximity threshold 112-1a for item 108a-1, from which item 108a-1 is identifiable. In another example, consider two items 108c-1 and 108c-2 on display screen 104c of user device 102c, where they have the same size, but item 108c-1 has a higher sensitivity level 176 than item 108c-2. In this example, item 108c-1 is identifiable at a greater distance from the display screen 104c compared to item 108c-2. Thus, the dynamic proximity threshold engine 152 determines the proximity threshold 112-1c for item 108c-1 that is closer to the display screen 104c than the proximity threshold 112-2c for item 108c-2.

At step 316, the masking rule engine 156 determines whether any of the viewers 110 are unauthorized to view the selected item 108 based on the determined authority level 166 of each of the viewers 110 in step 308 and the determined sensitivity level 176 of the selected item 108 in step 312. In the example of item 108a-1 as the selected item 108 containing sensitive information on user device 102a, the masking rule engine 156 determines whether any of viewers 110-1a, 110-2a, and 110-3a are unauthorized to view the item 108a-1 based on the authority level 166 of each of the viewers 110-1a, 110-2a, and 110-3a and sensitivity level 176 of item 108a-1.

If, at step 316, the masking rule engine 156 determines that none of the viewers 110 are unauthorized to view the selected item 108, the method 400 proceeds to step 424 where the selected item 108 is displayed on the display screen 104 of the user device 102. In the example of item 108a-1 as the selected item 108 containing sensitive information on user device 102a, if the masking rule engine 156 determines that none of viewers 110-1a, 110-2a, and 110-3a are unauthorized to view item 108a-1, user device 102a displays item 108a-1.

If, at step 316, the masking rule engine 156 determines that at least one viewer among viewers 110 is not authorized to view the selected item 108, the method 300 proceeds to step 318.

At step 318, the masking rule engine 156 determines whether the distance 114 of any of the unauthorized viewers among viewers 110 is within the dynamic proximity threshold 112 of the selected item 108. In the example of item 108a-1 as the selected item 108 containing sensitive information on user device 102a, if the masking rule engine 156 determines that at least one of viewers 110-1a, 110-2a, and 110-3a is not authorized to view item 108a-1, the masking rule engine 156 determines whether the distance 114 of any of viewers 110-1a, 110-2a, and 110-3a who is unauthorized to view item 108a-1 is within the proximity threshold 112-1a of item 108a-1.

If, at step 318, the masking rule engine 156 determines that none of the unauthorized viewers are at a distance within the dynamic proximity threshold 112 of the selected item 108, the method 300 proceeds to step 324 where the selected item 108 is displayed on the display screen 104 of the user device 102. In the example of item 108a-1 as the selected item 108 containing sensitive information on user device 102a, if the masking rule engine 156 determines that none of the viewers 110 unauthorized to view item 108a-1 among viewers 110-1a, 110-2a, and 110-3a are at a distance within the proximity threshold 112-1a of item 108a-1, the user device 102a displays item 108a-1.

If, at step 318, the masking rule engine 156 determines that at least one authorized viewer among viewers 110 is at a distance within the dynamic proximity threshold 112 of the selected item 108, the method 300 proceeds to step 320.

At step 320, the masking rule engine 156 masks the selected item 108 containing sensitive information. The masking rule engine 156 may use any appropriate method or technique to mask or conceal the selected item 108. In some examples, the masking of the selected item 108 may comprise scrambling at least a portion of the selected item 108 with a string of "XXX", substituting the selected item 108 with another item that the viewers 110 are authorized to view, applying a numeric variance (e.g., +/−10%) to the selected item 108, encrypting the selected item 108 with an encryption key, deleting the selected item 108 108, blocking at least a portion of the selected item 108 with a filled shape (e.g., portions 202-206 in FIGS. 2a and 2b), modifying a background in addition to deleting the selected item 108, reducing the size of the selected item 108 until the selected item 108 is not identifiable to the unauthorized viewers, blurring at least a portion of the selected item and/or the like. In the example of item 108a-1 as the selected item 108 containing sensitive information on the user device 102a and viewer 110-1a is not authorized to view item 108a-1, the masking rule engine 156 masks item 108a-1.

At step 322, the dynamic proximity threshold engine 152 determines whether to select another item among items 108 containing sensitive information. Here, the dynamic proximity threshold engine 152 determines whether all the items 108 containing sensitive information have been evaluated. The dynamic proximity threshold engine 152 determines to select another item among items 108 containing sensitive information when at least one item among items 108 containing sensitive information has not yet been evaluated. The method 300 returns to step 310 in response to the dynamic proximity threshold engine 152 determining to select another item 108 containing sensitive information. In this case, method 300 returns to step 310, where the dynamic proximity threshold engine 152 selects another item among items 108 containing sensitive information. Otherwise, the method 300 proceeds to step 324 where the selected item 108 is displayed on the display screen 104 of the user device 102, in response to the dynamic proximity threshold engine 152 determining there is no more item among items 108 containing sensitive information is left to evaluate.

Example of a Method for Data Unmasking

Figure 4:
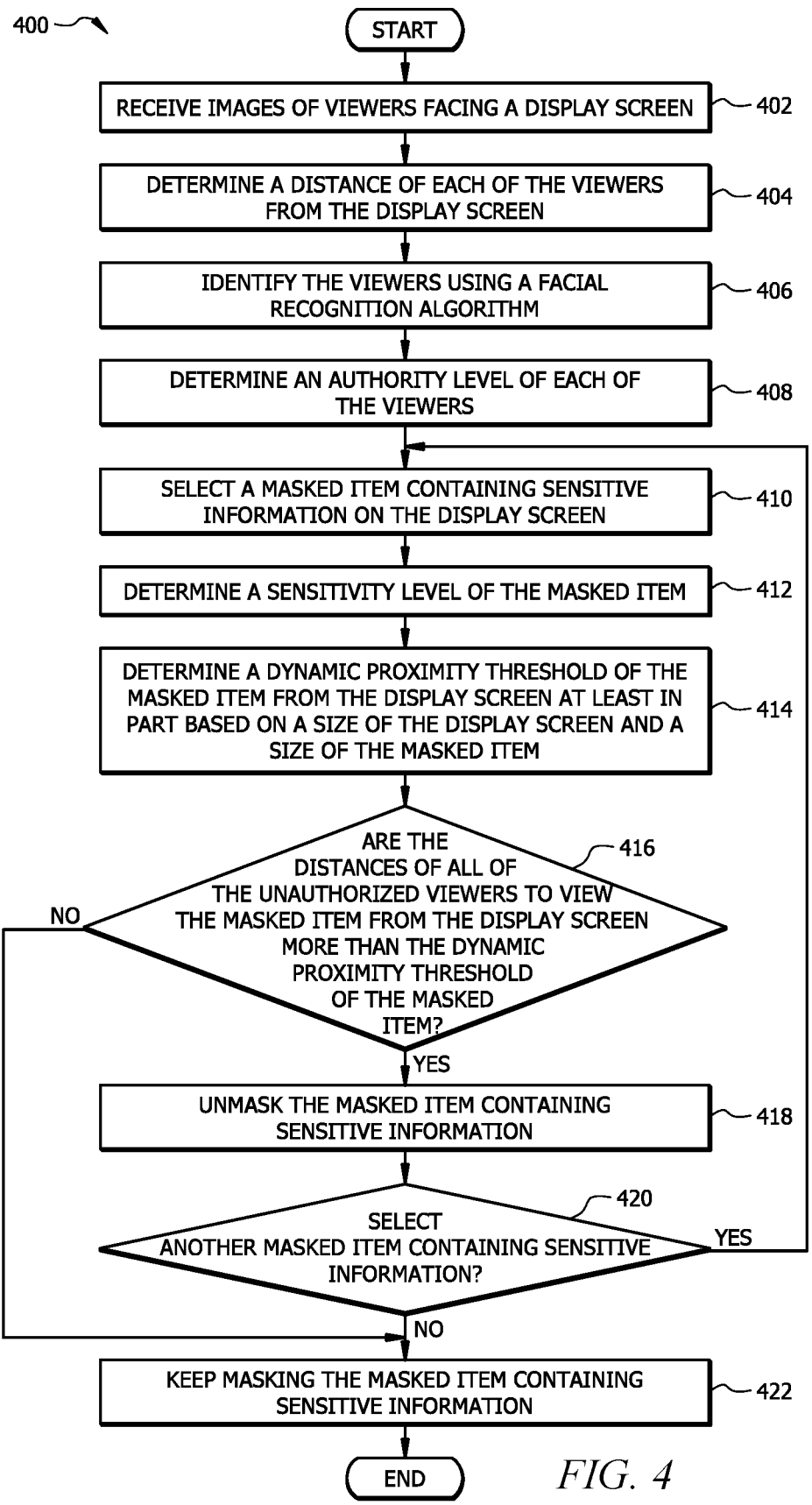
FIG. 4 illustrates an example flow chart of a method of dynamically unmasking data on display screens.

FIG. 4 illustrates an example flow chart of a method 400 of dynamically unmasking items 108 containing sensitive information on display screen 104 of user device 102 (e.g., any of user devices 102a, 102b, and 102c). One or more of steps 402-422 of the method 400 may be implemented, at least in part, in the form of executable code stored on non-transitory, tangible, machine-readable media that when run by one or more processors may cause the one or more processors to perform one or more of the steps 402-422. In some embodiments, method 400 can be performed by one or more user devices 102 in system 100 of FIG. 1, including the image capturing engine 124, the dynamic proximity threshold engine 152, the deep learning system engine 154, and/or the masking rule engine 156. Aspects of the steps 402-422 of method 400 have been covered in the description for FIGS. 1 and 2; and additional aspects are provided below. In some embodiments, the method 400 may be carried out after the method 300 where at least one item 108 containing sensitive information has been masked. In some embodiments, the method 400 is a response in any changes in item information 172 of masked items 108, the distance of the viewers unauthorized to view masked items 108, and/or changes in authority level 166 of the unauthorized viewers. As such, steps 402-408 may correspond to steps 302-308 in FIG. 3.

The method 400 begins at step 402 where the image capturing engine 124 receives images of viewers 110 facing display screen 104 of user device 102 (e.g., any of display screens 104a, 104b, 104c of user devices 102a, 102b, and 102c) from a camera 106 (e.g., any of cameras 106a, 106b, 106c) connected to the user device 102.

At step 404, the image capturing engine 124 determines distance 114 of each of the viewers 110 from the display screen 104 and updates distance 114 of viewer 110 if the distance 114 of the viewer 110 from the display screen 104 has been changed compared to a previously determined distance 114 of the viewer 110 from the display screen 104 in step 304 of method 300. At step 406, the deep learning system engine 154 identifies the current viewers 110 and determines whether current viewers 110 are the same as viewers identified in step 306 of method 300.

At step 408, the deep learning system engine 154 determines authority level 166 of each of the viewers 110 and updates the determined authority levels 166 of the viewers 110 in step 308 of method 300, if there are any changes in at least one viewer's authority level 166. For example, viewer 110 who is not authorized to view an item 108 containing sensitive information may be granted authority to view the item 108 by an admin. In this case, the administrator may change the authority level 166 of the viewer 110 so that the viewer 110 may view the item 108.

At step 410, the dynamic proximity threshold engine 152 selects a masked item containing sensitive information among masked items 108 containing sensitive information as a result of step 320 in method 300. For example, the dynamic proximity threshold engine 152 may select item 108a-1 in FIG. 1 that was masked in method 300.

At step 412, the dynamic proximity threshold engine 152 determines sensitivity level 176 of the selected masked item 108 containing sensitive information and detects if there is any change in the sensitivity level 176 of the selected masked item 108. In some examples, the dynamic proximity threshold engine 152 may detect that the sensitivity level 176 of the selected masked item 108 (e.g., item 108a-1) is increased because of an addition of a new highly sensitive information to the masked item 108. In some examples, the dynamic proximity threshold engine 152 may detect that the sensitivity level 176 of the selected masked item 108 (e.g., item 108a-1) is decreased as a result of, e.g., needing to share the masked item 108 with one or more viewers 110 or publishing the masked item 108. For example, the masked item 108 may include a business strategy for an organization that is needed to be shared with one or more viewers 110. In this case, the administrator may determine that the sensitivity level 176 of the masked item 108 is decreased.

At step 414, the dynamic proximity threshold engine 152 determines dynamic proximity threshold 112 of the masked item 108 from the display screen 104 of the user device 102 based at least upon the size of the display screen 104, the size of the masked item 108, content 174 of the selected item 108, sensitivity level 176 of the selected item 108. The dynamic proximity threshold engine 152 also detects any changes in the size of the display screen 104, the size of the masked item 108 and content 174 of the selected item 108, and updates/adjust the dynamic proximity threshold 112 of the masked item 108, accordingly. In the example of item 108a-1 as the selected masked item 108, the dynamic proximity threshold engine 152 may update/adjust the proximity threshold 112-1a of item 108a-1 if the size of the item 108a-1 changes and/or the user device 102a is connected to a different size display screen 104. In the example of item 108a-1 as the selected masked item 108, the dynamic proximity threshold engine 152 may update/adjust the proximity threshold 112-1a of item 108a-1 if the content 174 of the item 108a-1 is changed, for example by adding more sensitive information to item 108a-1 or removing a portion of the sensitive information from item 108a-1.

At step 416, the masking rule engine 156 determines whether the distances 114 of all viewers 110 who are unauthorized to view the masked item 108 from the display screen 104 become more than the dynamic proximity threshold 112 of the masked item 108. In the example of item 108a-1 as the selected masked item and viewer 110-1a is unauthorized to view item 108a-1, the masking rule engine 156 determines whether the distance 114-1a of viewer 108a-1a from the display screen 104a is now more than proximity threshold 112-1a.

If, at step 416, the masking rule engine 156 determines that even one of the viewers 110 unauthorized to view the masked item 108 is still at distance 114 within the dynamic proximity threshold 112 of the masked item 108, the method 400 proceeds to step 422 where the masking rule engine 156 keeps masking the masked item 108 containing sensitive information. In the example of item 108a-1 as the selected masked item 108 and viewer 110-1a is unauthorized to view item 108a-1, if the distance 114-1a of viewer 110-1a from the display screen 104a is still within proximity threshold 112-1a, the masking rule engine 156 keeps masking item 108a-1.

If, at step 416, the masking rule engine 156 determines that the distances 114 of all viewers 110 who are unauthorized to view the masked item 108 from the display screen 104 become more than the dynamic proximity threshold 112 of the masked item 108, the method 400 proceeds to step 418.

At step 418, the masking rule engine 156 unmasks the masked item 108 containing sensitive information. In the example of item 108a-1 as the selected masked item 108 and viewer 110-1a is unauthorized to view item 108a-1, if the distance 114 of viewer 110-1a from the display screen 104a is now more than proximity threshold 112-1a, the masking rule engine 156 unmasks item 108a-1. The masking rule engine 156 may unmask the masked item 108 due to different scenarios. In some examples, the viewers 110 who are unauthorized to view the masked item 108 are granted authority by the administrator to view the masked item 108. In the example of item 108a-1 as the selected masked item 108 and viewer 110-1a is unauthorized to view item 108a-1, if viewer 110-1a is granted authority to view item 108a-1, the masking rule engine 156 unmasks item 108a-1. In some examples, the viewers 110 who are unauthorized to view the masked item 108 may move away from the display screen 104, outside the dynamic proximity threshold 112 of the masked item 108. In this case, the masked item 108 may be unmasked if there is no unauthorized viewer among viewers 110 left within the proximity threshold 112 of the masked item 108.

At step 420, the dynamic proximity threshold engine 152 determines whether to select another masked item among items 108 containing sensitive information. Here, the dynamic proximity threshold engine 152 determines whether all the masked items 108 containing sensitive information have been evaluated. The dynamic proximity threshold engine 152 determines to select another masked item among items 108 containing sensitive information when at least one masked item among items 108 has not yet been evaluated. The method 400 returns to step 410 in response to the dynamic proximity threshold engine 152 determining to select another masked item among items 108 containing sensitive information. In this case, method 400 returns to step 410, where the dynamic proximity threshold engine 152 selects another masked item 108 containing sensitive information. Otherwise, the method 400 proceeds to step 422 where the masking rule engine 156 keeps masking the masked item 108 containing sensitive information, in response to the dynamic proximity threshold engine 152 determining there is no more item among items 108 containing sensitive information is left to evaluate.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for dynamically masking items containing sensitive information on a display screen of a user device, comprising:
    a processor configured to:
        receive one or more images of one or more viewers in front of the display screen from a camera of the user device;
        determine a distance of each viewer among the one or more viewers from the display screen;
        identify each viewer among the one or more viewers facing the display screen using a facial recognition algorithm, wherein each viewer has an authority level to view certain information;
        for each item containing sensitive information on the display screen:
        determine a sensitivity level of the item containing sensitive information, based on item information stored in a memory;
        based at least in part upon a size of the display screen and a size of the item containing sensitive information, determine a dynamic proximity threshold for the item containing sensitive information, wherein the dynamic proximity threshold for the item is a distance from the display screen from which the item is identifiable;
        determine whether each of the viewers is authorized to view the item containing sensitive information, based on the authority level of each viewer; and
        dynamically mask the item containing sensitive information if at least one viewer is at a distance that is within the dynamic proximity threshold and is not authorized to view the item containing sensitive information; and
    a memory operably coupled to the processor and configured to store the sensitivity level of each item containing sensitive information, the authority levels of the one or more viewers, and the dynamic proximity threshold of each item containing sensitive information;
    wherein: the items comprise a first item associated with a first sensitivity level and a second item associated with a second sensitivity level that is lower than the first sensitivity level;
    the processor is further configured to determine a first dynamic proximity threshold for the first item based at least upon the first sensitivity level and a second dynamic proximity threshold for the second item based at least upon the second sensitivity level, wherein the second dynamic proximity threshold is at a greater distance from the display screen than the first dynamic proximity threshold;
    the processor is further configured to mask the first item and display the second item if a viewer who is not authorized to view the first item and is authorized to view the second item is at a distance within the first dynamic proximity threshold; and
    the processor is further configured to display the first item and the second item if the viewer is at a distance between the first dynamic proximity threshold and the second dynamic proximity threshold.

2. The system of claim 1, wherein:
    the item comprises a text, an image or a video; and
    the sensitive information associated with the item is account information, personal information, or software code.

3. The system of claim 1, wherein the item containing sensitive information is an image or a video, the dynamic proximity threshold of the item is determined further based on a resolution of the item.

4. The system of claim 1, wherein the processor identifies each viewer by:
    searching for each viewer's image in viewers' profile database in the memory; and
    for each viewer, matching a viewer's image to one of the viewer's profile, wherein the viewers' profile database includes information of one or more viewers' authority level to view the item containing sensitive information.

5. The system of claim 1, wherein if a viewer is not authorized to view the item containing sensitive information, the processor is further configured to change the viewer's authority level such that the viewer is authorized to view the item containing sensitive information.

6. The system of claim 1, wherein the processor is further configured to unmask the item containing sensitive information for a viewer who is not authorized to view the item and is at a distance within the dynamic proximity threshold of the item, when the viewer moves away from the display screen to a distance from the display screen that is more than the dynamic proximity threshold of the item.

7. The system of claim 1, wherein the masking of the item containing sensitive information comprises one or both of blocking at least a portion of the item with a filled shape and reducing the size of the item such that the item not be identifiable to viewers who are not authorized to view the item.

8. A method for dynamically masking items containing sensitive information on a display screen of a user device, comprising:
- receiving one or more images of one or more viewers in front of the display screen from a camera of the user device;
- determining a distance of each viewer among the one or more viewers from the display screen;
- identifying each viewer among the one or more viewers facing the display screen using a facial recognition algorithm, wherein each viewer has an authority level to view certain information;
- for each item containing sensitive information on the display screen:
- determining a sensitivity level of the item containing sensitive information, based on item information stored in a memory;
- based at least in part upon a size of the display screen and a size of the item containing sensitive information, determining a dynamic proximity threshold for the item containing sensitive information, wherein the dynamic proximity threshold for the item is a distance from the display screen from which the item is identifiable;
- determining whether each of the viewers is authorized to view the item containing sensitive information, based on the authority level of each viewer; and
- dynamically masking the item containing sensitive information if at least one viewer is at a distance that is within the dynamic proximity threshold and is not authorized to view the item containing sensitive information;
- wherein: the items comprise a first item associated with a first sensitivity level and a second item associated with a second sensitivity level that is lower than the first sensitivity level;
- the method further comprises determining a first dynamic proximity threshold for the first item based at least upon the first sensitivity level and a second dynamic proximity threshold for the second item based at least upon the second sensitivity level, wherein the second dynamic proximity threshold is at a greater distance from the display screen than the first dynamic proximity threshold;
- the method further comprises masking the first item and display the second item if a viewer who is not authorized to view the first item and is authorized to view the second item is at a distance within the first dynamic proximity threshold; and
- the method further comprises displaying the first item and the second item if the viewer is at a distance between the first dynamic proximity threshold and the second dynamic proximity threshold.

9. The method of claim 8, wherein:
the item comprises a text, an image or a video; and
the sensitive information associated with the item is account information, personal information, or software code.

10. The method of claim 8, wherein the item containing sensitive information is an image or a video, the dynamic proximity threshold of the item is determined further based on a resolution of the item.

11. The method of claim 8, the identifying each viewer comprises:

searching for each viewer's image in viewers' profile database in the memory; and
for each viewer, matching a viewer's image to one of the viewer's profile, wherein the viewers' profile database includes information of one or more viewers' authority level to view the item containing sensitive information.

12. The method of claim 9, wherein if a viewer is not authorized to view the item containing sensitive information, the method is further comprises changing the viewer's authority level such that the viewer is authorized to view the item containing sensitive information.

13. The method of claim 10, further comprises unmasking the item containing sensitive information for a viewer who is not authorized to view the item and is at a distance within the dynamic proximity threshold of the item, when the viewer moves away from the display screen until the distance of the viewer from the display screen is more than the dynamic proximity threshold of the item.

14. The method of claim 11, wherein the masking of the item containing sensitive information comprises blocking at least a portion of the item with a filled shape and reducing the size of the item such that the item not be identifiable to viewers who are not authorized to view the item.

15. A non-transitory computer-readable medium storing instructions that when executed by a processor causes the processor to:
- receive one or more images of one or more viewers in front of a display screen from a camera of a user device;
- determine a distance of each viewer among the one or more viewers from the display screen;
- identify each viewer among the one or more viewers facing the display screen using a facial recognition algorithm, wherein each viewer has an authority level to view certain information;
- for each item containing sensitive information on the display screen:
- determine a sensitivity level of the item containing sensitive information, based on item information stored in a memory;
- based at least in part upon a size of the display screen and a size of the item containing sensitive information, determine a dynamic proximity threshold for the item containing sensitive information, wherein the dynamic proximity threshold for the item is a distance from the display screen from which the item is identifiable;
- determine whether each of the viewers is authorized to view the item containing sensitive information, based on the authority level of each viewer; and
- dynamically mask the item containing sensitive information if at least one viewer is at a distance that is within the dynamic proximity threshold and is not authorized to view the item containing sensitive information;
- wherein: the items comprise a first item associated with a first sensitivity level and a second item associated with a second sensitivity level that is lower than the first sensitivity level;
- the method further comprises determining a first dynamic proximity threshold for the first item based at least upon the first sensitivity level and a second dynamic proximity threshold for the second item based at least upon the second sensitivity level, wherein the second dynamic proximity threshold is at a greater distance from the display screen than the first dynamic proximity threshold;
- the method further comprises masking the first item and display the second item if a viewer who is not authorized to view the first item and is authorized to view the second item is at a distance within the first dynamic proximity threshold; and the method further comprises displaying the first item and the second item if the viewer is at a distance between the first dynamic proximity threshold and the second dynamic proximity threshold.

16. The non-transitory computer-readable medium of claim 15, wherein:

the item comprises a text, an image or a video; and the sensitive information associated with the item is account information, personal information, or software code.

17. The non-transitory computer-readable medium of claim 15, wherein the processor identifies each viewer by:

searching for each viewer's image in viewers' profile database in the memory; and for each viewer, matching a viewer's image to one of the viewer's profile, wherein the viewers' profile database includes information of one or more viewers' authority level to view the item containing sensitive information.

18. The non-transitory computer-readable medium of claim 15, wherein the processor is further configured to unmask the item containing sensitive information for a viewer who is not authorized to view the item and is at a distance within the dynamic proximity threshold of the item, when the viewer moves away from the display screen until the distance of the viewer from the display screen is more than the dynamic proximity threshold of the item.

* * * * *